April 26, 1955     H. L. BOWDITCH     2,707,092
PNEUMATIC SYSTEM SHUT-OFF VALVE FOR MEASURING INSTRUMENTS
Filed Oct. 23, 1952
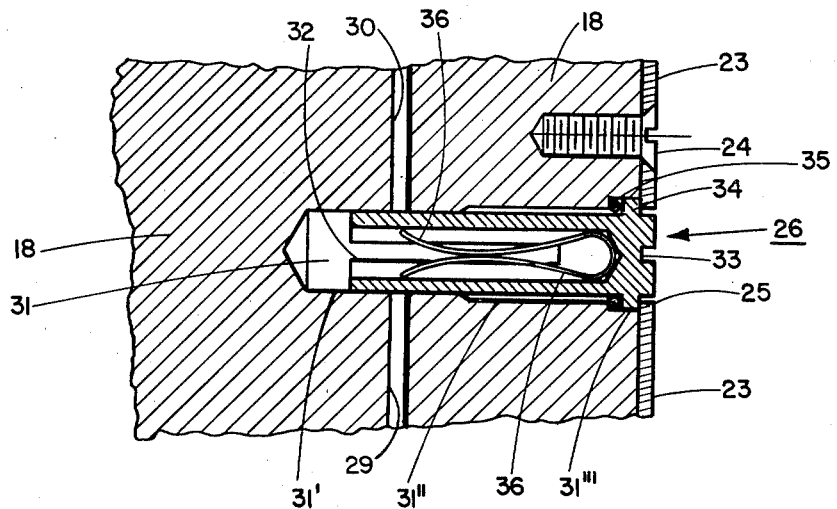
FIG. I
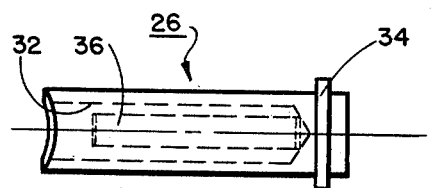
FIG. II
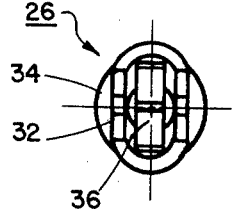 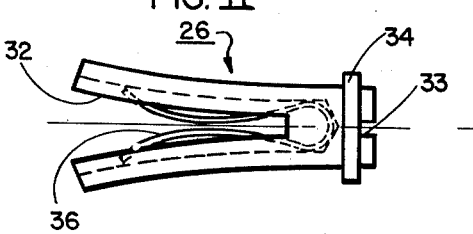 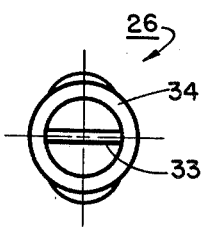
FIG. IV     FIG. III     FIG. V
INVENTOR.
HOEL L. BOWDITCH
BY
*Curtis, Morris & Safford*
ATTORNEYS

United States Patent Office 2,707,092
Patented Apr. 26, 1955

2,707,092

PNEUMATIC SYSTEM SHUT-OFF VALVE FOR MEASURING INSTRUMENTS

Hoel L. Bowditch, Foxboro, Mass., assignor to The Foxboro Company, Foxboro, Mass., a corporation of Massachusetts Application October 23, 1952, Serial No. 316,535

1 Claim. (Cl. 251—182)

This invention relates to measuring instruments of the type incorporating a system of pneumatic pipes and wherein changes in the value of a variable condition under measurement produce corresponding responses in the pneumatic system, which in turn produce functions such as indication, recording, and control, and has particular reference to a shut-off valve for use in certain of the pneumatic pipes of such a system.

In measuring instruments of this type, it is often desirable to have shut-off valves which may pneumatically isolate certain parts of the instrument, shut-off supply pressures, or otherwise selectively control the application of pneumatic pressure to or from different parts of the instrument. With such arrangements it is easy to make repairs, adjustments, or replacements in the instruments. An example of such an arrangement may be considered, for instance, in a control instrument. Such an instrument may operate a control valve in accordance with signals received from a measurement signal unit which is responsive to changes in the value of a variable condition, and may be supplied with power from a pneumatic power supply unit. Pneumatic transmission conduits are provided between such valves and units and the instrument, and shut-off valves may be used in such conduits.

Various difficulties have been encountered in the past in connection with shut-off valves of this general nature and application. The on-off action of these valves involves connecting and disconnecting pneumatic pipes or passages and it has been found difficult to do this simply, economically, and effectively without undesirable pneumatic leakage.

It is an object of this invention to provide a new and improved shut-off valve for measuring instrument pneumatic systems.

It is a further object to provide a nonleaking shut-off valve which is simple, economical, and effective.

These and other objects of this invention will be in part pointed out and will be in part apparent from the following description, and from the accompanying drawings, in which:

Figure I is an enlarged, fragmentary, horizontal section, showing a valve rotor in an embodiment of this invention;

Figure II is a side elevation view of the valve rotor of Figure I, showing the rotor removed from the pneumatic conduit block, i. e. in unrestricted condition;

Figure III is a top view of the valve rotor of Figure II;

Figure IV is a left end view of the valve rotor of Figure III; and

Figure V is a right end view of the valve rotor of Figure III.

Figure I illustrates, as an embodiment of this invention, the structure and arrangement of a shut-off valve unit 26 as it is mounted in a pneumatic conduit block 18. This shut-off unit is formed of horn-like nylon plastic which is resilient and soapy, but will not flow under ordinary pressures. A pneumatic passage 29 is provided as one pneumatic connection, and a pneumatic passage 30 is provided as another pneumatic connection. These passages 29 and 30 lead to a shut-off valve cylindrical recess 31 in the block 18. The passages 29 and 30 are preferably located in aligned opposition to each other in the recess 31. The shut-off valve unit 26 lies within the recess 31 as a means of connecting and disconnecting the passages 29 and 30. The shut-off valve unit is provided with a generally cylindrical sleeve which fills and fits the recess 31 and is provided with a bifurcated, clothes pin-like structure. Rotation of the valve unit thus closes off the passages 29 and 30 in one position and in another position opens the passages 29 and 30 to each other through the bifurcation of the shut-off valve unit 26. The bifurcation forms slots 32 lengthwise of the valve unit sleeve and oppositely aligned therein and when the slots are aligned with the passages 29 and 30, a continuous passage is provided, and the valve is open. The head of the shut-off valve unit 26 is transversely slotted as at 33, with the slot 33 aligned with the bifurcation slots 32. Thus the rotary position of the end slot 33 is indicative of the rotary position of the bifurcation slots 32, and therefore is indicative of whether the shut-off valve is open or closed. In the showing of Figure I, the valve is closed. In actual practice, the block 18 or the cover strip 23 may be provided with markings indicative of the locations of the passages 29 and 30 within the block, for reference with respect to the rotary position of the end slot 33.

The valve recess 31 is provided with a close fit diameter 31' adjacent the openings of the pneumatic passages 29 and 30 therein, a clearance diameter 31'' toward the mouth of the recess, and a mounting and sealing diameter 31'''. The valve unit 26, in its bifurcated body portion is formed with an outer diameter closely matching the close fit diameter 31' of the valve recess 31. Thus, a close fit between the valve unit and the recess is provided where it is needed, at and adjacent the openings of the passages 29 and 30. Further, as an economy, the recess 31, at points removed from adjacency with the passages 29 and 30, is provided with the clearance diameter 31'' which does not require close tolerances.

The valve unit 26 has a solid, head portion which includes the end slot 33 and further includes a peripheral boss 34 which substantially fills the valve recess mounting and sealing diameter 31'''. A resilient pneumatic seal O-ring 35 is mounted in this sealing diameter between the boss 34 and the main body of the block 18 and the cover strip 23 bears on the outer face of the boss 34 to press the valve unit inwardly against the O-ring 35. A spring 36 formed of beryllium copper is mounted within the sleeve formation of the valve unit 26. This spring is formed like a common hairpin, with its head forced into the valve unit sleeve and with its free ends acting transversely of the valve unit to bias the bifurcations thereof apart and against the walls of the valve recess 31.

The spring 36 is formed to provide a simple spring bias, and in addition, the legs of the spring are curved toward each other so as to engage each other when under confining pressure, as shown in Figure III, at a point centrally of the length of the spring to add to the strength of the bias action of the spring.

With this arrangement a very effective, simple and economical shut-off valve is provided. The plastic, horn-like nylon material of the valve unit 26 is of the soapy surface type and thus provides its own lubricant so that the valve unit may readily be rotated by applying a screwdriver to the head slot 33. A tight, secure, shut-off of the pneumatic passages 29 and 30 is provided by the close fitting arrangement of the valve unit in the recess 31 with the bifurcated portions of the unit under reinforced spring bias against the wall of the recess 31. The valve unit material is horn-like and will not flow into the passages 29 and 30 under the spring bias.

Figure II is an illustration of the valve unit 26 alone, with the bifurcation parallel to the face of the drawing and with the bifurcated portions spread under the bias of the spring 36, and unrestricted by the block 18.

Figure III is another view of the valve unit 26, as in Figure II, with the bifurcation perpendicular to the face of the drawing, and Figures IV and V show, respectively, the left and right ends of the presentation of Figure III.

This invention, therefore, provides a novel measurement instrument pneumatic system shut-off valve wherein on-off switching is accomplished by rotary movement in a simple, economical structure, without pneumatic leakage.

As many embodiments may be made in the above

I claim:

For use in a measuring instrument having a pneumatic transmission arrangement therein, a shut-off valve for said arrangement comprising, in combination, a base block having a pneumatic transmission passage therethrough and a valve recess therein transversely of said passage, with said recess having a close fit diameter portion at said passage, a clearance diameter portion at one side of said passage, and a sealing diameter portion extending from said clearance diameter portion to an outer face of said block, a valve unit mounted in said valve recess for rotation therein to open and close said passage, said valve unit comprising a valve pin of horn-like nylon plastic which is resilient, soapy, and resistant to flow under ordinary measuring instrument pressures, said pin extending in said base block recess to a point beyond said base block passage and having as a normal diameter the said close fit diameter, an annular shoulder extending into said sealing diameter portion of said base block recess, and a slotted head portion, said pin, further, having a recess therein extending from its inner end substantially the full length of the pin, lengthwise slots in said pin into said pin recess forming a bifurcation which extends a substantial distance away from said base block passage on both sides thereof and to a point substantially short of the bottom of said pin recess, a beryllium copper hairpin-like spring contained in said pin recess with its head in force fit mounting in the bottom portion of said pin recess, its legs curved toward each other to a point of mutual engagement within the length of said bifurcation and spaced from the inner walls of said pin recess, and curved away from each other to terminate in bifurcation spreading engagement with the inner walls of said pin at points of alignment with said base block passage, an O-ring pneumatic seal between said pin shoulder and said base block, and a cover plate mounted on said base block in holding relation with said pin shoulder, said cover plate having an opening therethrough to provide access to said slotted head portion of said pin.

References Cited in the file of this patent

UNITED STATES PATENTS

| | | |
|---|---|---|
| 716,403 | Forwood | Dec. 23, 1902 |
| 1,982,706 | Teeter | Dec. 4, 1934 |
| 2,075,460 | Parker | Mar. 30, 1937 |
| 2,433,732 | Brown | Dec. 30, 1947 |
| 2,520,092 | Fredrickson | Aug. 22, 1950 |
| 2,599,274 | Murnin | June 3, 1952 |